United States Patent [19]
Zaiser et al.

[11] Patent Number: 5,239,897
[45] Date of Patent: Aug. 31, 1993

[54] AUTOMATIC SELECTOR DEVICE FOR A MULTI-GEAR CHANGE-SPEED GEARBOX

[75] Inventors: Wolfgang Zaiser, Steinheim; Gerhard Wagner, Remseck, both of Fed. Rep. of Germany

[73] Assignee: Mercedes-Benz AG, Fed. Rep. of Germany

[21] Appl. No.: 886,259

[22] Filed: May 21, 1992

[30] Foreign Application Priority Data

May 30, 1991 [DE] Fed. Rep. of Germany ....... 4117739

[51] Int. Cl.$^5$ ........................ B60K 41/22; B60K 41/06
[52] U.S. Cl. ........................................ 74/869; 74/867; 74/868; 74/335
[58] Field of Search ................... 74/335, 867, 868, 869

[56] References Cited

U.S. PATENT DOCUMENTS

| | | |
|---|---|---|
| 3,274,858 | 9/1966 | Meyer et al. |
| 4,204,590 | 5/1980 | Tanaka ............................ 74/520 X |
| 4,204,591 | 5/1980 | Tani et al. ......................... 74/520 X |
| 4,326,433 | 4/1982 | Black et al. ....................... 74/335 X |
| 4,338,832 | 7/1982 | Pelligrino ......................... 74/867 X |
| 4,579,015 | 4/1986 | Fukui ................................ 74/335 X |
| 4,637,269 | 1/1987 | Hasegawa et al. ................ 74/335 |
| 4,721,002 | 1/1988 | Horii ................................ 74/360 X |
| 4,754,949 | 7/1988 | Fukamachi ....................... 475/2 X |
| 4,939,899 | 7/1990 | Holzhauer et al. ............... 60/412 |
| 4,979,599 | 12/1990 | Nishida ........................... 192/3.58 X |
| 5,072,814 | 12/1991 | Hama et al. ...................... 192/3.57 |
| 5,117,953 | 6/1992 | Machida et al. .................. 192/3.57 |

FOREIGN PATENT DOCUMENTS

| | | |
|---|---|---|
| 0019534 | 1/1983 | European Pat. Off. . |
| 1935097 | 2/1970 | Fed. Rep. of Germany . |
| 1908914 | 9/1970 | Fed. Rep. of Germany . |
| 2744286 | 4/1979 | Fed. Rep. of Germany . |
| 2855086 | 2/1980 | Fed. Rep. of Germany . |
| 744481 | 4/1933 | France . |

*Primary Examiner*—Leslie A. Braun
*Assistant Examiner*—David E. Henn
*Attorney, Agent, or Firm*—Evenson, McKeown, Edwards & Lenahan

[57] ABSTRACT

An automatic selector device for a multi-gear change-speed gearbox permits selection of the gears by a respective gear apparatus, e.g., clutch or brake, which is actuated by a selector actuator. The operating pressure of the selector actuator is switched on and off in each case by a selector valve. The selector valves are connected to a multi-path control valve for actuation by way of a control pressure force, and the control valve is actuated by an electromotive valve actuator whose operation depends on an electronic control unit.

6 Claims, 2 Drawing Sheets

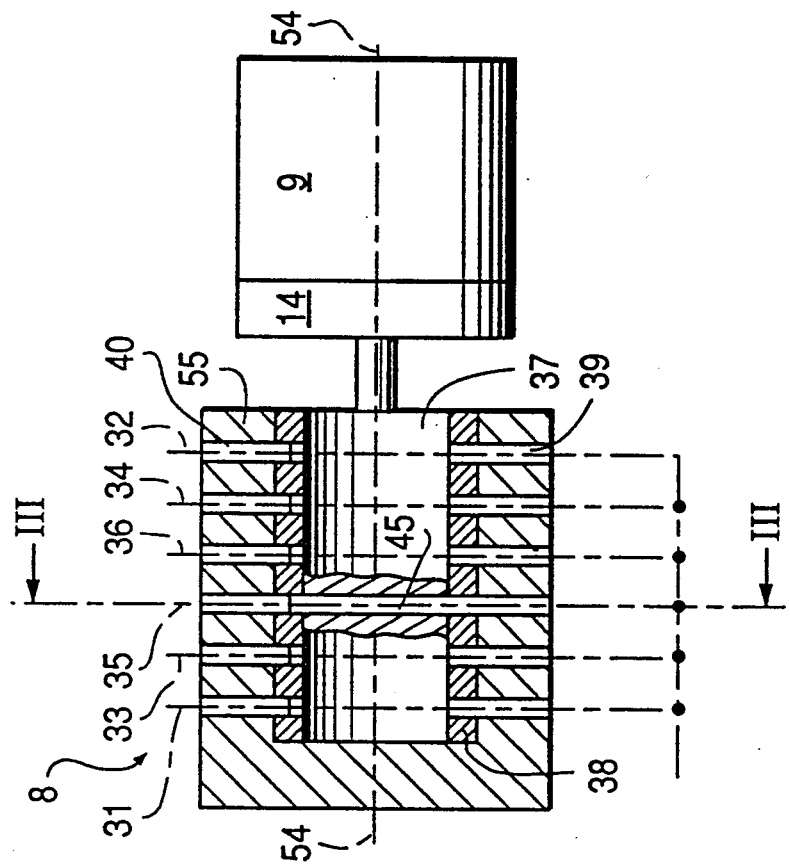
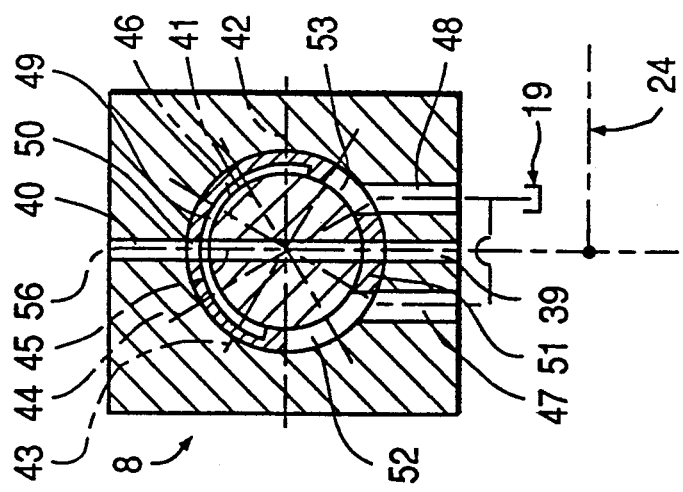

AUTOMATIC SELECTOR DEVICE FOR A MULTI-GEAR CHANGE-SPEED GEARBOX

CROSS-REFERENCE TO RELATED APPLICATION

This application is related to application Ser. No. 07/886,246 filed on May 21, 1992, in the name of Wolfgang Zaiser and Gerhard Wagner for AUTOMATIC SELECTOR DEVICE FOR A MULTI-GEAR CHANGE-SPEED GEARBOX.

BACKGROUND AND SUMMARY OF THE INVENTION

The present invention relates generally to an automatic selector device for a multi-gear change-speed gearbox in which are provided gear selectors actuatable by selector actuators of axial piston type in order to form a desired gear, an electronic control unit, a multi-path valve common to the selector actuators and an electromotive valve actuator operative in response to the control unit for actuating the multi-path valve, the multi-path valve having for each gear, an associated valve position in which the respective selector actuator is connected to an operating pressure source.

In a known selector device of the type shown in DE 27 44 286 A1, operating pressure is switched on and off directly by way of a multi-path selector valve common to all the selector actuators. The multi-path selector valve is driven into its valve positions associated with a particular gear by a stepper motor whose operation depends on the electronic control unit. Since large pressure medium flows are necessary for the selector actuators in the case of rapid selecting movements, the known multi-path selector valve is, among other things, of large and heavy design because of the flow cross-sections necessary so that the use of an electromotive stepper motor also becomes problematical.

U.S. Pat. No. 3,274,858 shows an automatic selector device of a different type, i.e. an epicyclic gearbox with eight forward gears and four reverse gears for driving an agricultural tractor. Two plate clutches are located in the force path between an input shaft which can be driven by a drive engine, and the epicyclic gearbox and a third plate clutch is located between the epicyclic gearbox and an output shaft leading to the engine. Three plate brakes are each connected to an outer central wheel of the epicyclic gearbox, and a fourth plate brake is connected to an inner central wheel of the epicyclic gearbox. Of this total of seven selector devices, each of which is actuated by way of a selector actuator having a single-acting axial piston, the selector actuators of the two input-end plate clutches are each connected to a separate selector valve. A 2/6-way valve is used for the selector valve of the one input-end plate clutch which is engaged in the two lowest and the two highest forward gears. A 2/5-way valve is used for the selector valve of the other input-end plate clutch, which is engaged in the six upper forward gears, and is directly connected to a reservoir pressure conduit emerging from a pressure reservoir. The 2/6-way selector valve is connected via a switch-off valve which can be actuated by a clutch pedal to a supply pressure conduit which charges the pressure reservoir and which is supplied by a pressure pump. A 2/5-way selector valve common to the two selector actuators of two plate brakes each connected to an outer central wheel is supplied by a pressure conduit which emerges from the 2/6-way selector valve of the single input-end plate clutch and which is led via the 2/5-way selector valve of the other input-end plate clutch and is then in open connection with the part of the supply conduit emerging from the switch-off valve when both input-end plate clutches are disengaged. A 2/5-way selector valve is again common to the two selector actuators of the output-end third plate clutch and the third plate brake connected to the inner central wheel, which 2/5-way selector valve, in turn, is not directly connected to the section of the reservoir pressure conduit connecting the switch-off valve to the pressure reservoir but via a 3/4-way selector valve of the axial spool type. As a departure from this arrangement, no special selector valve is provided for the selector actuator of the fourth plate brake but, when one of the reverse gears is engaged, the operating pressure is supplied to this selector actuator via the 3/4-way selector valve. In this known selector device, therefore, a 2/6-way selector valve and three 2/5-way selector valves are used for three plate clutches and three plate brakes. These valves can be reversed as a function of a second selector valve, i.e. a 9/6-way valve of the axial spool type. The multi-path valve is directly supplied by the supply pressure conduit and is manually actuated jointly with the first-mentioned 3/4-way selector valve. With this known selector device, an attempt was made to permit power shifts without interruption to the tractive force in agricultural operation with short selection times and rapid driving manoeuvres between forward and reverse motion.

An automatic hydraulic selector device for change-speed gearboxes is shown in DE 19 08 914 A1, and uses a pressure medium pump, a selector pressure valve connected to the pressure medium pump, several gear selection valves connected in parallel with the selector pressure valve, pair of friction clutches which can be engaged and disengaged alternately by the gear selection valves and a valve device subjected to pressure in the friction clutch to be engaged. By way of the valve device, the ventilation of the friction clutch to be disengaged is controlled as a function of the rise in pressure in the friction clutch to be engaged. A selector pressure valve can be influenced by the engine torque to maintain a selector pressure in the pressure conduit which varies with the engine torque and a hydraulic double-acting valve device for closing and opening purposes can be controlled, on one hand, by the pressure drop in the friction clutch to be disengaged, and by the pressure rise in the friction clutch to be engaged, and, on the other hand, by the variable selection pressure. In this manner, the pressure, in the friction clutch which has to be engaged, at which the valve device is opened and the friction clutch which has to be disengaged is ventilated, is matched to the pressure (transmission pressure) at which the friction clutch to be engaged transmits the particular load torque. The gear selection valves can be actuated individually by an electromagnetic actuator, and an attempt is made to control the overlapping disengagement and engagement of the friction clutches during a gear change such that an interruption to the drive torque is avoided. For this purpose, the friction clutches should be actuated by variable transmission pressures which depend on the engine torque to be transmitted.

An object on which the present invention is based comprises the creation of an automatic selector device of a multi-gear change-speed gearbox with gear-wheels which can be disconnected from their shaft, in which large pressure medium flows and a high pressure level can be made available for rapid selection movements of the selector actuators without a multiplicity of electromagnetic control valves being necessary for this purpose because the flow cross-sections of the latter are, in general, relatively small.

The foregoing object has been achieved by the present invention in an advantageous manner by the provision of a 3-position cylinder with a double-acting axial piston constitutes the selector actuator for two adjacent gears, and a 4/3-way selector valve is arranged to switch on and off operating pressure of each 3-position cylinder, the 4/3-way selector valve being actuatable by a control pressure force supplied via the multi path valve constituting a control valve, and each selector valve is independently connected to a main pressure conduit which can be at a high pressure level whereas the multi-path valve is connected to an auxiliary pressure conduit independent with respect to pressure level of the main pressure conduit.

In the selector device according to the present invention, it is now possible to use selector spool valves which can be configured with large flow cross-sections and are controlled by a common multi-path control valve operating with small control flows, and therefore of small size, without the necessity of solenoid valves.

Moreover, a conventional stepper motor of relatively low torque can be used advantageously as the valve actuator for actuating the multi-path control valve, and a conventional 3-position cylinder with a double-acting axial piston can be provided to actuate in each case two of the relevant synchronizing clutches.

Another feature according to the present invention is a 4/3-way selector valve which is used for switching on and off the operating pressure in the two operating pressure chambers of the respective 3-position cylinder.

According to the present invention, it is, in fact, possible to use a multi-path control valve of the axial spool type. In order to avoid the use of a transmission for converting a rotary motion into a linear motion, it is advantageous in the selector device according to the invention for the drive of the multi-path control valve by way of a stepper motor for this control valve to be configured as a rotary spool valve.

It is also advantageous in accordance with the present invention, when using an intrinsically low-torque stepper motor, for the motor to operate on the multi-path control valve via an intermediate transmission.

In a particularly advantageous embodiment of the multi-path control valve of rotary spool type of the present invention, an angular position and a valve housing plane normal to an axis of rotation of the rotary spool valve are associated with the rotary spool of the multi-path control valve for each gear, and in each valve housing plane, a valve inlet connected to a pressure source, a substantially unpressurized valve outlet, a valve outlet connected to a control pressure conduit associated with the gear and a control duct of the rotary spool are associated such that the valve outlet connected to the control pressure conduit is connected via the control duct in the associated angular position to the valve inlet whereas, in other angular positions, the valve outlet is connected to the unpressurized valve outlet.

BRIEF DESCRIPTION OF THE DRAWINGS

These and further objects, features and advantages of the present invention will become more readily apparent from the following detailed description of a currently preferred embodiment when taken in conjunction with the accompanying drawings wherein:

FIG. 2 is an axial sectional view of the multi-path control valve of the selector-device of FIG. 1; and FIG. 3 is a cross-sectional view of the multi-path control valve of the selector device of FIG. 1 along line III—III in FIG. 2.

DETAILED DESCRIPTION OF THE DRAWINGS

Figure 1:
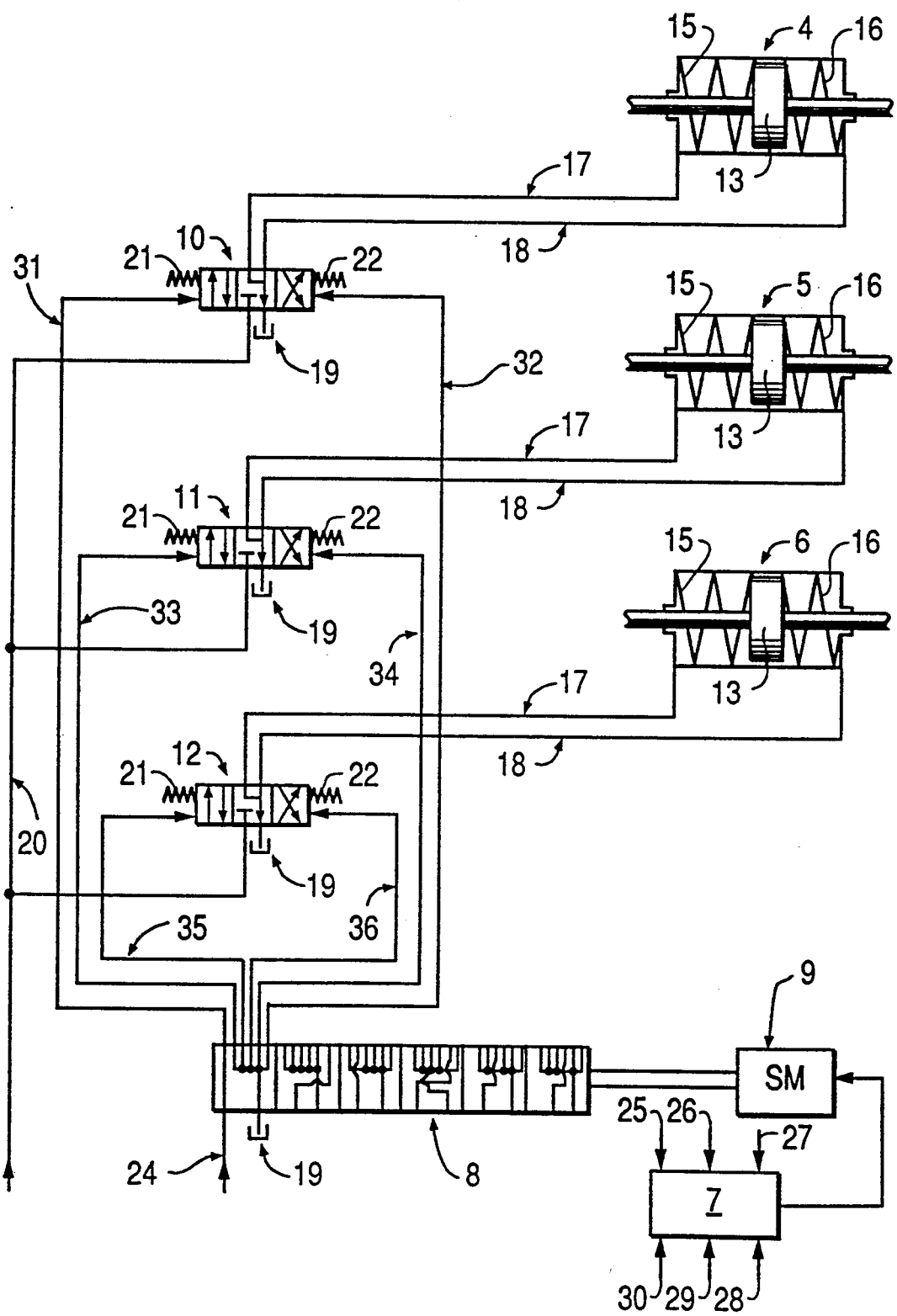
FIG. 1 is a block circuit diagram of a selector device according to the present invention for a change-speed gearbox with gearwheels, each of which can be disconnected from their shaft by way of a gearwheel clutch.

Referring to FIG. 1, the selector device of the present invention operates to select five forward gears and one reverse gear by way of six selector actuators which are combined into the form of three 3-position cylinders 4, 5, 6, which in each case have a double-acting axial piston 13 held in its illustrated neutral position shown (or can be driven thereinto) by spring devices 15, 16. The two operating pressure chambers of the 3-position cylinders 4, 5, 6 are each connected to an associated selector valve by one operating pressure conduit 17 or 18. The two selector valves of a 3-position cylinder 4 or 5 or 6 are combined in a 4/3-way selector valve 10, 11, 12, which can be respectively driven by spring devices 21, 22 into a central switch-off position in which both the connected operating pressure conduits 17, 18 are connected to a substantially unpressurized reservoir 19 and a main pressure conduit 20, also connected to the 4/3-way valve, is shut off both from the operating pressure conduits 17, 18 and from the reservoir 19.

The selector valve 10 can be switched by a first control pressure conduit 31 into a first gear position in which the main pressure conduit 20 is connected to the operating pressure conduit 17 of the 3-position cylinder 4 so that, in known manner, the relevant operating piston 13 is caused to engage the gearwheel clutch which connects the loose wheel of the first gear gearwheel stage to its shaft. In this first gear position of the selector valve 10, the other operating pressure conduit 18 is connected to the reservoir 19.

The selector valve 10 can be switched by a second control pressure conduit 32 into a second gear position in which the main pressure conduit 20 is connected to the other operating pressure conduit 18 of the 3-position cylinder 4 so that the relevant axial piston 13 is caused to engage the gearwheel clutch by way of which the loose wheel of the second gear gearwheel stage is connected to its shaft. In this second gear position of the selector valve 10, the other operating pressure conduit 17 is connected to the reservoir 19.

In a corresponding manner, the selector valve 11 is driven by a third control pressure conduit 33 into a third gear position and, via a fourth control pressure conduit 34, into a fourth gear position. The 3-position cylinder 5 is caused, in the first case, by way of the operating pressure conduit 17, to engage the gearwheel clutch connecting the loose wheel of the third gear gearwheel stage to its shaft and is caused, in the other case, by way of the operating pressure conduit 18, to engage the gearwheel clutch connecting the loose wheel of the fourth gear gearwheel stage to its shaft.

The selector valve 12 also operates in a corresponding manner because it can be driven by a fifth control pressure conduit 35 into a fifth gear position and, by a sixth control pressure conduit 36, into a reverse gear position. The 3-position cylinder 6 is caused, in the first case, by the control pressure conduit 17, to engage the gearwheel clutch connecting the loose wheel of the fifth gear gearwheel stage to it shaft and is caused, in the second case, by the operating pressure conduit 18, to engage the intermediate gearwheel in the teeth of the gearwheels of the reverse gear gearwheel stage.

The reservoir 19, the main pressure conduit 20 and the six control pressure conduits 31 to 36 are connected to an 8/6-way control valve 8 such that in the six positions of the control valve 8, each corresponding to one of the six gears of the change-speed gearbox, the associated single control pressure conduit is connected to an auxiliary pressure conduit 24 and the other five control pressure conduits are connected to the reservoir 19.

The control valve 8 can have a further neutral position in which all the control pressure conduits 31 to 36 are connected to the reservoir 19 and the auxiliary pressure conduit 24 is shut off both from all the control pressure conduits and from the reservoir 19.

The control valve 8 is driven by a stepper motor 9 whose operation depends on an electronic control unit 7. The control unit 7 processes, in known manner, input signals 25 to 30 which provide information about the respective operating point of the driving engine, the gearbox output speed, an operating temperature, the selection range set by a manual selection unit by the driver, with or without locking of gears, the selector program set by the driver (e.g., an economy program) and the gear selected.

As shown in FIGS. 2 and 3, the control valve 8 is configured as a rotary spool valve whose rotary spool 37 can be driven via an intermediate transmission 14 (e.g., a simple epicyclic gear) by the stepper motor 9 into six angular positions respectively associated with one of the gears of the gearbox. Six valve housing planes, normal to the valve axis 54—54, of the valve housing 55 of the control valve 8 are associated with the six angular positions of the rotary spool 37 as follows.

In a valve housing plane for the first gear located at the end of the valve housing 55 remote from the stepper motor 9, there are a valve outlet 40 of the valve housing 55 connected to the control pressure conduit 31 of the first gear, a control hole 41 (of which only the hole centerline is indicated in FIG. 3) diametrically penetrating the rotary spool 37, and a valve inlet 39 connected to the auxiliary pressure conduit 24.

In a corresponding manner, a valve housing plane, in which a valve outlet 40 is connected to the associated control pressure conduit, with a respective control hole 42 to 46 of the rotary spool 37 and a valve inlet 39 is connected to the auxiliary pressure conduit 24, is provided for each of the control pressure conduits 32 to 36 of the other five gears.

When the rotary spool 37 is located in an angular position corresponding to one of the gears, the control hole of the rotary spool located in the corresponding valve housing plane is aligned both with the valve outlet 40 connected to the control pressure conduit associated with this gear and to the valve inlet 39 located in the same plane, as is shown in FIG. 2 for the fifth gear in which the control hole 45 is aligned in this rotary spool position 56 with the valve outlet 40 connected to the control pressure conduit 35 of the fifth gear.

The rotary spool 37 operates in a control sleeve 38 fitted into the valve housing 55, and the control sleeve 38 has corresponding connecting holes 50 and 51 in order to connect the related valve outlet 40, via the associated control hole in the rotary spool 37, to the valve inlet 39 located in the same valve housing plane.

So that the particular valve outlet 40 will be connected to the reservoir 19 when the associated control hole in the rotary spool 37 is not in the aligned angular position, the associated connecting hole 50 of the control sleeve 38 emerges into a peripheral groove 49, on the inner surface of the control sleeve 38, which is in open connection with one end of the associated control hole in all angular positions of the valve spool.

The control sleeve 38 has two windowlike control openings 52, 53 which are each connected to the reservoir 19 via a further valve outlet 47 or 48, respectively. These control openings 52, 53 extend over angular ranges matched to the position of the valve inlets 39 such that the end of the control holes respectively located remote from the peripheral groove 49 is in open connection with one of the control openings 52 or 53 when the other end of the control hole is not aligned with the associated valve outlet 40. As a result, only the respective control pressure conduit is connected to the auxiliary pressure conduit 24 in each of the angular positions of the rotary spool 37, whereas the other five control pressure conduits are connected to the reservoir 19.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An automatic selector device for a multi-gear change-speed gearbox in which are provided gear selectors actuatable by selector actuators of axial piston type in order to form a desired gear, an electronic control unit, a multi-path valve common to the selector actuators and an electromotive valve actuator operatively connected to the control unit and multi-path valve so as to be responsive to the control unit for actuating the multi-path valve, the multi-path valve having, for each gear, an associated valve position in which the respective selector actuator is connected to an operating pressure source, wherein a 3-position cylinder with a double-acting axial piston constitutes the selector actuator for two adjacent gears, and a 4/3-way selector valve is operatively connected to each 3-position cylinder to switch on and off operating pressure of each 3-position cylinder, the 4/3-way selector valve being operatively connected to the multi-path valve so as to be actuatable by a control pressure force supplied via the multi-path valve, a main pressure conduit being independently operatively connected to each selector valve, which main pressure conduit is configured to be at a high pressure level, and an auxiliary pressure conduit is operatively connected to the multi-path valve independently with respect to pressure level of the main pressure conduit.

2. The selector device according to claim 1, wherein a stepper motor constitutes the electromotive valve actuator.

3. The selector device according to claim 1, wherein the multi-path control valve is configured as a rotary spool valve.

4. The selector device according to claim 1, wherein an intermediate transmission is located in a drive connection between the multi-path control valve and the electromagnetic valve actuator.

5. The selector device according to claim 3, wherein both an angular position and a valve housing plane normal to an axis of rotation of the rotary spool valve are associated with the rotary spool of the multi-path control valve for each gear, and in each valve housing plane, a valve inlet connected to a pressure source, a substantially unpressurized valve outlet, a valve outlet connected to a control pressure conduit associated with the gear and a control duct of the rotary spool are associated such that the valve outlet connected to the control pressure conduit is connected via the control duct in the associated angular position to the valve inlet whereas, in other angular positions, the valve outlet is connected to the unpressurized valve outlet.

6. The selector device according to claim 5, wherein the valve housing has an internal control groove open to the rotary spool in each of the valve housing planes associated with one gear in each case, into which control groove enters openly into a housing inner end of the valve outlet connected to the control pressure conduit, and the control groove extends sufficiently far peripherally so that the end of the control duct of the rotary spool interacting with the valve outlet connected to the control pressure conduit enters openly into the control groove in all angular positions.

* * * * *